United States Patent
Yu et al.

(10) Patent No.: US 11,102,226 B2
(45) Date of Patent: Aug. 24, 2021

(54) DYNAMIC SECURITY METHOD AND SYSTEM BASED ON MULTI-FUSION LINKAGE RESPONSE

(71) Applicant: SHENYANG INSTITUTE OF AUTOMATION, CHINESE ACADEMY OF SCIENCES, Liaoning (CN)

(72) Inventors: Haibin Yu, Liaoning (CN); Peng Zeng, Liaoning (CN); Jianming Zhao, Liaoning (CN); Xianda Liu, Liaoning (CN); Chunyu Chen, Liaoning (CN); Tianyu Wang, Liaoning (CN)

(73) Assignee: SHENYANG INSTITUTE OF AUTOMATION, CHINESE ACADEMY OF SCIENCES, Liaoning (CN)

( * ) Notice: Subject to any disclaimer, the term of this patent is extended or adjusted under 35 U.S.C. 154(b) by 244 days.

(21) Appl. No.: 16/317,493

(22) PCT Filed: May 7, 2018

(86) PCT No.: PCT/CN2018/085766
§ 371 (c)(1),
(2) Date: Jan. 11, 2019

(87) PCT Pub. No.: WO2018/214719
PCT Pub. Date: Nov. 29, 2018

(65) Prior Publication Data
US 2019/0253444 A1 Aug. 15, 2019

(30) Foreign Application Priority Data
May 26, 2017 (CN) .......................... 201710382960.2

(51) Int. Cl.
*H04L 29/06* (2006.01)
*G05B 19/05* (2006.01)
(Continued)

(52) U.S. Cl.
CPC .......... *H04L 63/1425* (2013.01); *G05B 19/05* (2013.01); *G06F 21/33* (2013.01);
(Continued)

(58) Field of Classification Search
CPC .................................................. H04L 63/1425
See application file for complete search history.

(56) References Cited

U.S. PATENT DOCUMENTS 10,205,733 B1 * 2/2019 Park ..................... H04L 63/1408
10,708,233 B2 * 7/2020 Goyal ................. H04L 63/1408
(Continued)

FOREIGN PATENT DOCUMENTS

CN      1604541 A    10/2007
CN    101521667 A     9/2009

OTHER PUBLICATIONS

Wan, Ming et al. "Chapter 54: Trusted Security Defense Architecture for Industrial Embedded Device", Instrument Standardization & Metrology, Dec. 26, 2015, No. 397A Guanganmen Wai Street, Beijing, ISSN: 1672-5611, pp. 8-21.
(Continued)

*Primary Examiner* — Harris C Wang
(74) *Attorney, Agent, or Firm* — Novick, Kim & Lee, PLLC; Allen Xue

(57) ABSTRACT

The present invention relates to a dynamic security method and system based on multi-fusion linkage response. In the method, a site control device conducts active response and passive response through identity authentication and key management to give an alarm for abnormal behaviors. The system comprises an access authentication active response module, an access control active response module, an access control passive response module, an abnormal pretending passive response module, a key vulnerability passive response module and an abnormal state passive response mechanism module. On the basis of ensuring validity and feasibility for the security of a terminal device, the present invention can build a secure and trusted industrial control system operating environment.

6 Claims, 6 Drawing Sheets

(51) Int. Cl.
*G06F 21/44* (2013.01)
*G06F 21/33* (2013.01)
*G06F 21/57* (2013.01)

(52) U.S. Cl.
CPC ............ *G06F 21/44* (2013.01); *G06F 21/577* (2013.01); *H04L 29/06* (2013.01); *H04L 63/0435* (2013.01); *H04L 63/0823* (2013.01); *H04L 63/102* (2013.01)

(56) References Cited

U.S. PATENT DOCUMENTS

| | | | |
|---|---|---|---|
| 2004/0162781 A1 | 8/2004 | Searl et al. | |
| 2006/0053491 A1* | 3/2006 | Khuti | H04L 63/1416 726/23 |
| 2008/0077976 A1* | 3/2008 | Schulz | H04L 9/3263 726/5 |
| 2012/0005480 A1* | 1/2012 | Batke | G06F 21/44 713/175 |
| 2012/0210388 A1* | 8/2012 | Kolishchak | G06F 21/552 726/1 |
| 2012/0266209 A1* | 10/2012 | Gooding | H04L 63/20 726/1 |
| 2014/0343732 A1* | 11/2014 | Obermeier | H04L 63/20 700/275 |
| 2015/0124595 A1* | 5/2015 | Yamagata | H04W 24/02 370/230 |
| 2016/0301695 A1* | 10/2016 | Trivelpiece | H04L 63/0876 |
| 2016/0357177 A1* | 12/2016 | Chand | G05B 19/4185 |
| 2018/0139214 A1* | 5/2018 | Anderson | H04L 63/1408 |
| 2019/0253444 A1* | 8/2019 | Yu | H04L 29/06 |

OTHER PUBLICATIONS

Wan, Ming et al., "Chapter 54: Trusted Security Defense Architecture for Industrial Embedded Device", Instrument Standardization & Metrology, Dec. 26, 2015, pp. 18-21, ISSN: 1672-5611.

* cited by examiner

DYNAMIC SECURITY METHOD AND SYSTEM BASED ON MULTI-FUSION LINKAGE RESPONSE

TECHNICAL FIELD

The present invention relates to a dynamic security method and system based on multi-fusion linkage response, can enable an industrial measurement and control network control device to construct a dynamic, secure and trusted environment, and belongs to the field of industrial control network security.

BACKGROUND

The Kaspersky industrial control system virus laboratory points out the construction of a secure and reliable terminal device, which is the foundation of constructing a secure and reliable whole system. Internationally, the theoretical system of the trusted computing technology is basically established. The current research mainly focuses on the fields of virtual technology, secure startup, remote attestation, trusted computing application and evaluation. Key technologies such as trusted chips and trusted operating systems have been productized and applied in important protection fields. Allen-Bradley, Tofino and other companies join TCG (Trusted Computing Group). Internationally famous industrial control system equipment companies began to consider enhancing reliability and security when designing products such as PLC (Programmable Logic Controller). Famous companies in the security field of industrial control systems also begin to use the trusted computing technology to enhance the security protection capability of the terminal.

The existing industrial control system cannot effectively integrate digital certificates, access control and anomaly detection, cannot realize dynamic regulation and is often passive for processing of network attacks. The present invention provides an effective dynamic processing mechanism to enable the industrial control system to have active secure state adjustment ability.

SUMMARY

In view of the above technical defects, the purpose of the present invention is to provide a trusted PLC dynamic security method and system based on multi-fusion linkage response.

The technical solution adopted to solve the technical problems by the present invention is: A dynamic security method based on multi-fusion linkage response is provided, wherein a site control device conducts active response and passive response through identity authentication and key management to give an alarm for abnormal behaviors, and the dynamic security method comprises the following steps:

an access authentication active response module, wherein the site control device conducts identity validity authentication on an authentication data flow through own digital certificate B and other communication nodes; and communication is allowed after passing the authentication;

an access control active response module, wherein data communication is immediately blocked and an alarm is given when an unauthorized access is detected on a non-authentication data flow;

an access control passive response module which is triggered when the access control active response module detects an abnormal behavior, wherein an administrator confirms whether the abnormal behavior is valid;

an abnormal pretending passive response module, wherein when an abnormal pretending behavior is detected on the non-authentication data flow, the administrator confirms whether the certificate needs to be processed;

a key vulnerability passive response module, wherein when a key vulnerability or an overdue event is detected on the non-authentication data flow, the administrator confirms whether the key needs to be processed; if so, negotiation of a session key is conducted; and an abnormal state passive response mechanism module, wherein when other abnormal behaviors are detected on the non-authentication data flow, a communication model is built to give an alarm for all behaviors that violate the communication model.

Before the site control device conducts active response and passive response through identity authentication and key management, a digital certificate A that represents an identity is pre-configured; then the site control device conducts site update on the digital certificate A in an actual environment; and a digital certificate B is acquired.

The site control device conducts identity validity authentication through an own digital certificate B and other communication nodes by the following steps:

a) an initiator initiates an identity authentication request to establish a TCP handshake link;

b) the initiator transmits the identity authentication request;

c) a receiver confirms the identity request;

d) the initiator transmits a signature certificate A;

e) the initiator transmits an encryption certificate B;

f) the receiver confirms the signature certificate A and the encryption certificate B transmitted by the initiator to conduct signature verification;

g) the receiver transmits a signature certificate C;

h) the receiver transmits an encryption certificate D; and i) the initiator confirms the signature certificate and the encryption certificate transmitted by the receiver to conduct signature verification to complete authentication.

Detection of the access control active response module for the non-authentication data flow comprises the following steps:

a) firstly, capturing data flows through a promiscuous mode of a network card;

b) conducting protocol analysis on the captured data;

c) parsing an application layer protocol of the protocol; and d) matching protocol parsing contents in the data flows with the set matching rule contents for consistence; if consistent, setting a journal or directly releasing the data flows; otherwise, blocking the data flows and warning; and preventing all the data flows from passing by default.

When the administrator confirms that the abnormal behavior is valid, the access control passive response module adds the behavior to a matching rule.

Negotiation of the session key comprises the following steps:

a) the initiator transmits a digital certificate B and signature data;

b) a receiver verifies the signature data of the initiator; if the signature data passes the authentication, communication is continued; and the receiver transmits own digital certificate B and the signature data;

c) the initiator verifies the signature data of the receiver; if the signature data passes the authentication, communication is continued; the initiator transmits symmetrical key pair information n encrypted based on the public key of the receiver; and a random number is attached;

d) the receiver transmits symmetrical key pair information m encrypted based on the public key of the initiator; and a random number is attached;

e) the initiator and the receiver process n information and m information to generate symmetrical key pairs; and the initiator encrypts a random number+time label using the symmetrical key pair to reply; and f) the receiver decrypts the data transmitted by the initiator, and adds 1 to the random number; and the receiver encrypts the information of the random number added with 1 and the time label using the symmetrical keys.

A dynamic security system based on multi-fusion linkage response comprises:

an access authentication active response module, wherein the site control device conducts identity validity authentication on an authentication data flow through own digital certificate B and other communication nodes; and communication is allowed after passing the authentication;

an access control active response module, wherein data communication is immediately blocked and an alarm is given when an unauthorized access is detected on a non-authentication data flow;

an access control passive response module which is triggered when the access control active response module detects an abnormal behavior, wherein an administrator confirms whether the abnormal behavior is valid;

an abnormal pretending passive response module, wherein when an abnormal pretending behavior is detected on the non-authentication data flow, the administrator confirms whether the certificate needs to be processed;

a key vulnerability passive response module, wherein when a key vulnerability or an overdue event is detected on the non-authentication data flow, the administrator confirms whether the key needs to be processed; if so, negotiation of a session key is conducted; and an abnormal state passive response mechanism module, wherein when other abnormal behaviors are detected on the non-authentication data flow, a communication model is built to give an alarm for all behaviors that violate the communication model.

The present invention has the following beneficial effects and advantages:

1. On the basis of ensuring validity and feasibility for the security of a terminal device, the present invention can build a secure and trusted industrial control system operating environment.

2. The present invention effectively integrates the digital certificates, access control and anomaly detection.

3. The present invention provides a capability of dynamically processing security threat for an industrial control system.

DETAILED DESCRIPTION

The present invention will be further described in detail below in combination with embodiments.

Figure 2:
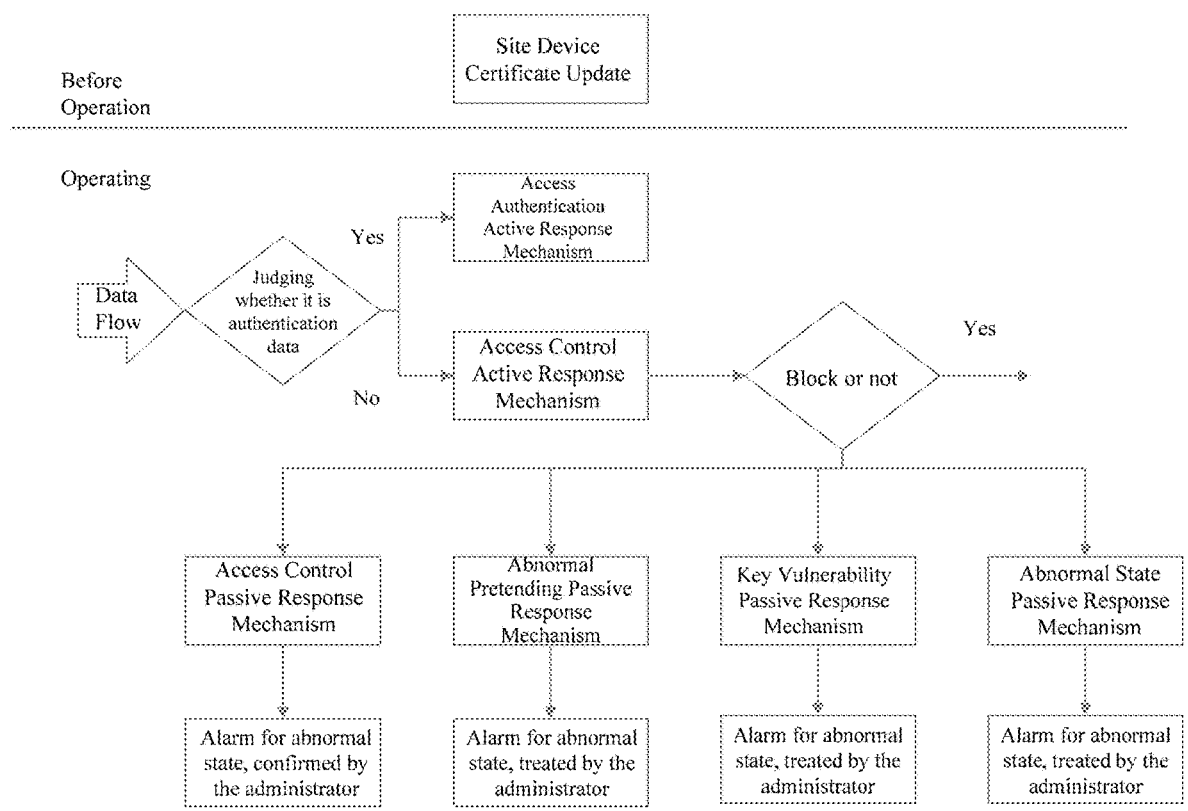
FIG. 2 is a flow chart for processing of a multi-fusion linkage response mechanism.
Figure 3:
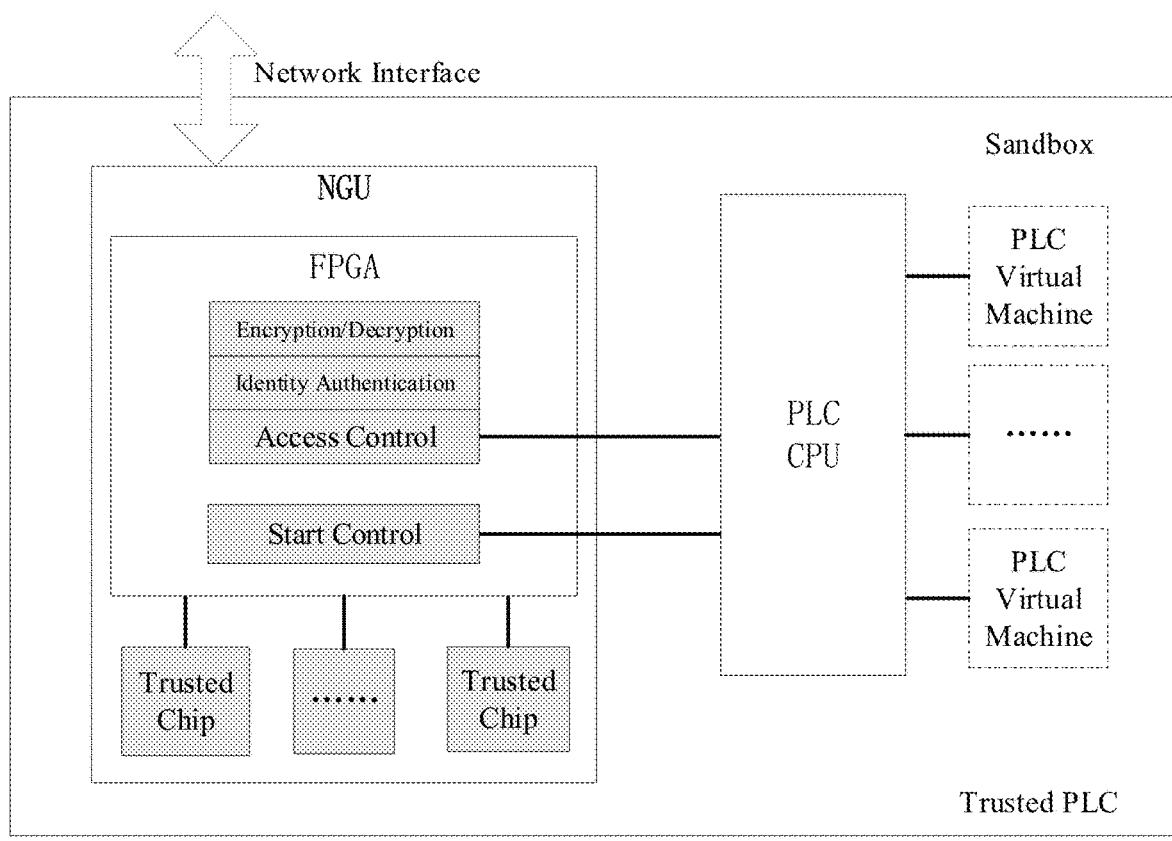
FIG. 3 is a functional architecture diagram of a trusted PLC when the method is realized.

As shown in FIG. 2, a dynamic security method based on multi-fusion linkage response is provided. A multi-fusion linkage response model based on P2DR (policy, protection, detection and response) takes usability precedence of the industrial measuring and controlling system as the principle, considers timeliness of industrial application, takes access control technology as the core for the trusted computing environment of the industrial measuring and controlling system, takes identity authentication and key management as means to conduct active response and passive response, and finally realizes secure and dynamic regulation of the trusted computing environment of the industrial measuring and controlling system. The method mainly comprises the following parts:

The present invention is applied to site control devices having trusted function in the industrial measuring and controlling system. In the embodiments of the present invention, PLC (programmable logic controller) is taken as a specific illustrating object. FIG. 3 is a functional architecture diagram of trusted PLC in the present embodiment, but not limited to application to the PLC.

Figure 1:
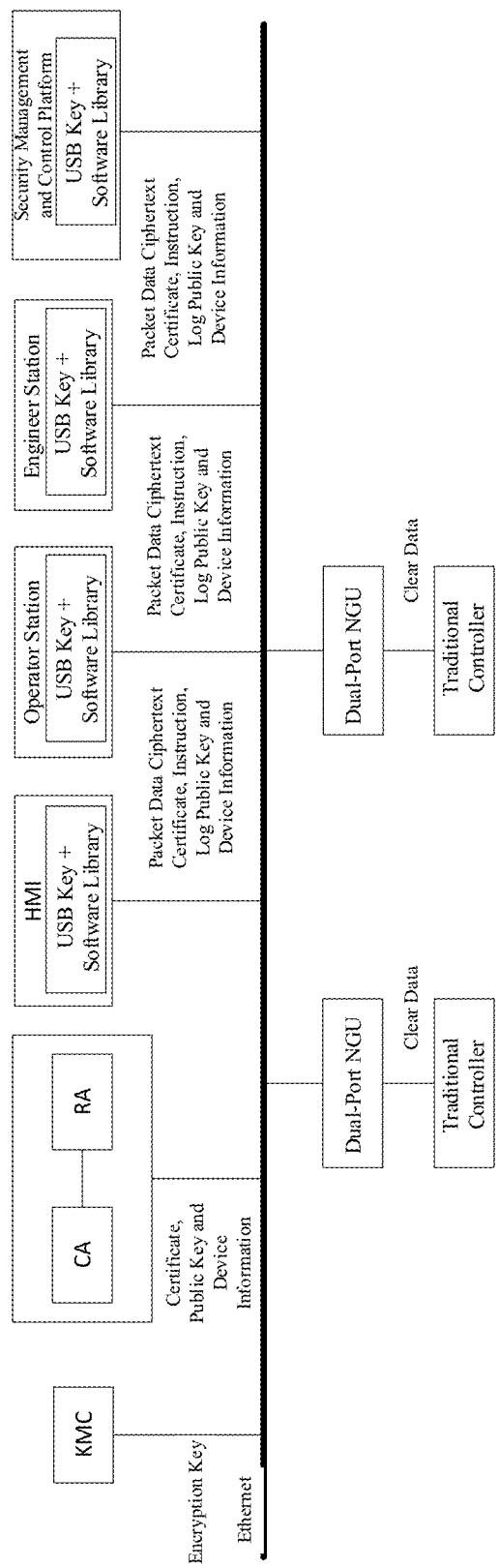
FIG. 1 is a schematic diagram of a trusted PLC environment architecture.
Figure 4:
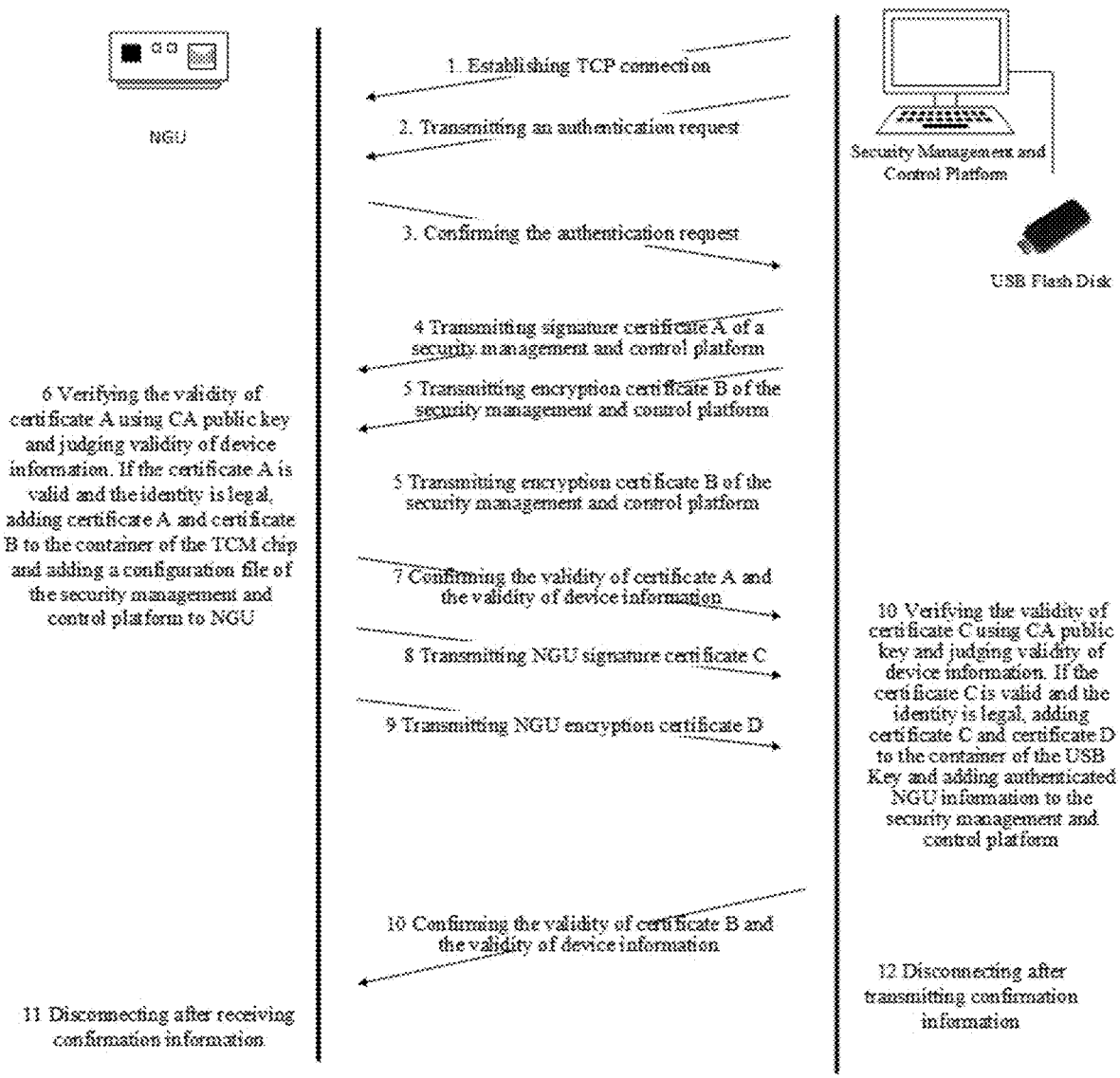
FIG. 4 is a flow chart of an identity authentication process of a management and control platform and NGU.

The following method process refers to an environment architecture based on trusted PLC (wherein dual-port NGU+traditional controller forms the trusted PLC), as shown in FIG. 1:

(1) The site control device (such as trusted PLC) updates the digital certificate: considering the convenience of site maintenance, a digital certificate A (factory certificate) representing an identity and issued by a digital certificate system is pre-configured by debugging a serial port; then in a practical deployment environment, the certificate is updated on site by site configuration personnel; the trusted PLC conducts update based on the digital certificate A to acquire a digital certificate B (operation certificate) used in this environment; the digital certificate B conforms to the certificate format of the site network topology structure;

(2) access authentication active response mechanism: valid terminal access is determined through identity authentication to automatically generate corresponding access control rule policies and realize real-time configuration and validity. The trusted PLC conducts identity validity authentication with other communication end points through own digital certificate B. The authentication process may refer to the identity authentication process of the management and control platform and NGU (network security unit) as shown in FIG. 4. Once the authentication is passed, access authentication permission rules are added to the NGU module of the trusted PLC, i.e., communication between the terminal and the management and control platform is allowed, with the following format:

source IP address source MAC address destination IP address destination MAC address direction ACCEPT The identity authentication process is described in detail, wherein FIG. 4 takes NGU (defined as a receiver) and a security management platform (defined as an initiator) as examples, but this process is adapted to the identity authentication process among other nodes of the method of the present application:

a) preferably, one party initiates a first step of an identity authentication request to establish a TCP handshake link;

b) then the initiator transmits the identity authentication request including IP address, MAC, node name and signature content;

c) a receiver confirms the identity request and transmits own IP address, MAC, node name and signature content;

d) the initiator transmits a signature certificate including signature information on the signature content and time label;

e) the initiator transmits an encryption certificate including key information encrypted by receiver public key, time label and signature information;

f) the receiver confirms the signature certificate and the encryption certificate transmitted by the initiator and the signature verification means comprises signature content, signature information on the signature content, time label, key information encrypted by the receiver public key, time label and signature information;

g) the receiver transmits a signature certificate: see d;

h) the receiver transmits an encryption certificate: see e;

i) the initiator confirms the signature certificate and the encryption certificate transmitted by the receiver, and signature verification means and content comprise the content of f) step.

Figure 6:
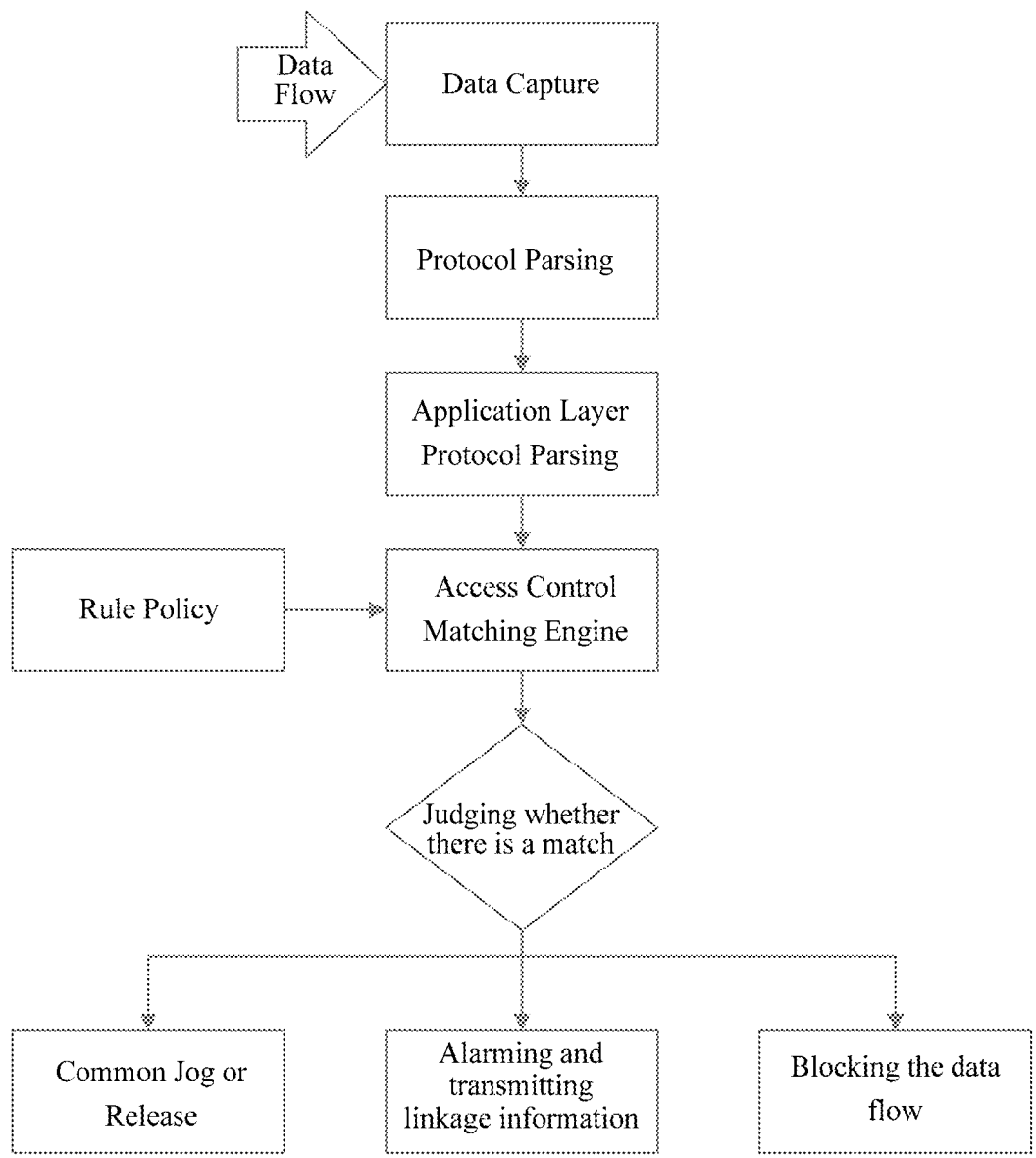
FIG. 6 is a flow chart of access control.

(3) access control active response mechanism: the access control method is designed based on the manner of "white list"; the default rule prevents all data traffics; when the access of unauthorized user permission is detected based on the access control method, data communication is immediately blocked and an alarm is given, wherein refer to FIG. 6 for the access control flow. Generation of access control rules mainly comprises: the management and control platform issues the rules and then verifies the rules by both parties; and the rules are accessed legally after verification of step 2).

For the non-authentication data flow, the active response access control mechanism is entered:

a) firstly, capturing data flows through a promiscuous mode of a network card;

b) conducting protocol analysis on the captured data to analyze protocol content properties including five attributes: source IP address, destination IP address, source port number, destination port number and protocol type;

c) parsing an application layer protocol, i.e., parsing the application layer protocol of a specific protocol, such as function code of Modbus protocol, start address, address number, read and write attributes, application message type of Powerlink protocol, node ID number, identification number, time stamp and other attributes;

d) an access control matching engine conducts active response through knowledge of matching rule policies. The source of the policies mainly comprises two parts: manual addition and identity authentication addition. Function packaging is conducted through a string matching algorithm to ensure whether protocol parsing contents in the matching data flows are consistent with the contents of the matching rule policy.

The matching results of access control include three results: all data flows are prevented from passing by default; if the rule policies allowed to pass are matched, a common log is set or the data flows are directly released; and if the rule policies prohibited to pass are matched, the data flows shall be blocked and warned.

(4) Access control passive response mechanism: by referring to the access control method in (3), when an abnormal behavior of an unauthorized user is detected, the access control passive response mechanism is triggered, and the triggered content is "the administrator confirms whether the key is negotiated again". This method mainly detects abnormal user operation or behavior under valid access of (2), for example, the data on flow exceeds the threshold, the operation behavior is not consistent with the expectation (this method conducts training and judgment through support vector machine and other algorithms), etc. These abnormal behaviors give an alarm for anomaly. The validity of these behaviors is confirmed by the administrator. If the administrator confirms that the behaviors are valid (it is necessary to discuss the time within which processing is conducted with the user, because such abnormal behaviors are allowed to pass early), the access control mechanism adds valid rules to the active response mechanism.

(5) Abnormal pretending passive response mechanism: when possible abnormal pretending behaviors, such as man-in-the-middle attack detection (detecting routing jump number, time stamp length, inconsistence of the parsing content with the identity, etc.), refusal by other users due to repeated identity authentication of normal users, etc. are detected by this module, the administrator confirms whether the certificate needs to be processed, wherein the main processing manner is user certificate update that updates other communication keys of nodes which are in communication.

Figure 5:
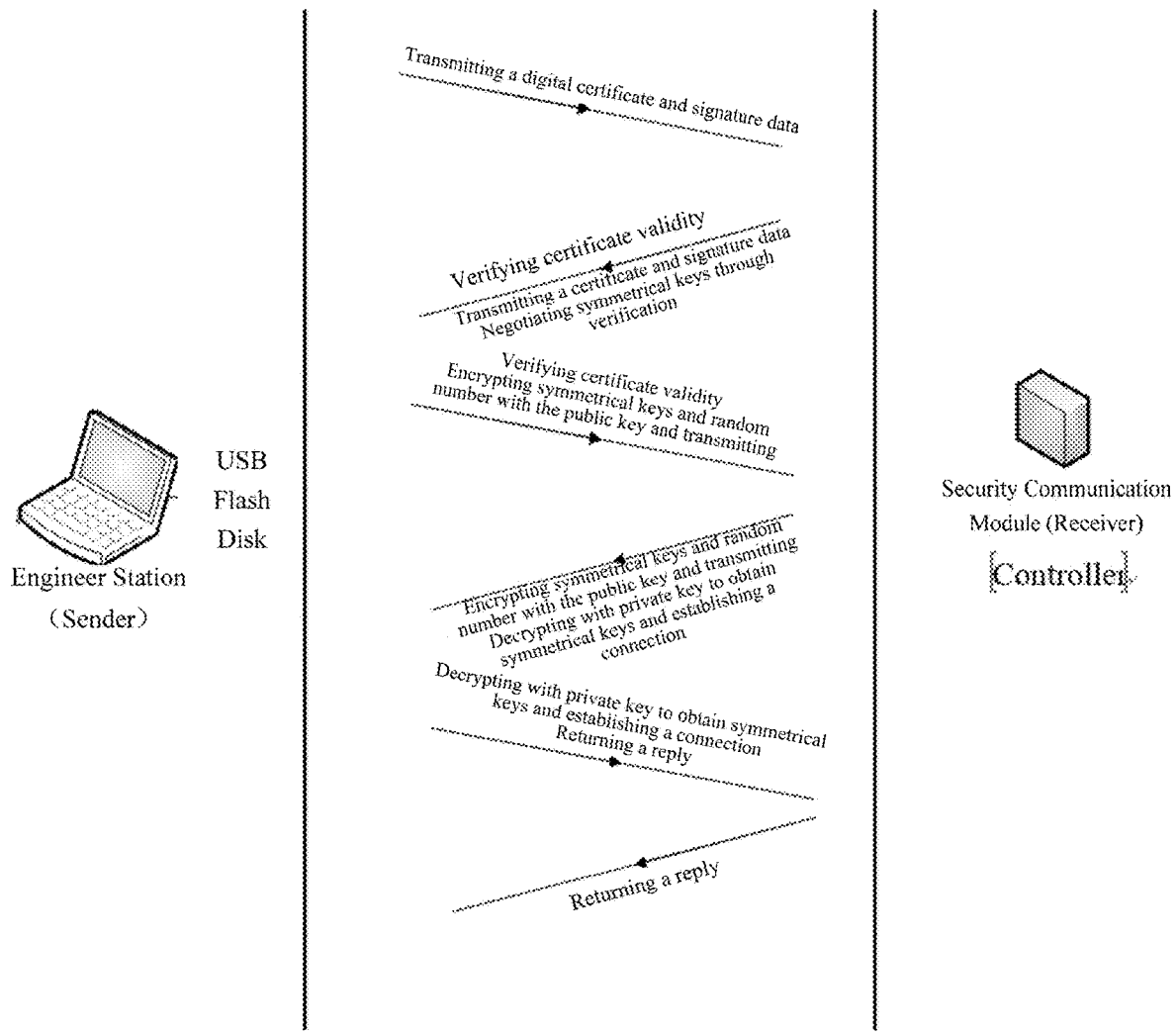
FIG. 5 is a flow chart of key negotiation.

(6) Key vulnerability passive response mechanism: when a key vulnerability or an overdue event is detected by the system, the administrator confirms whether the key needs to be processed. This method mainly detects whether the negotiated communication key is overdue because time label is used for detection based on the generated key, and whether the key has vulnerability. If the negotiated key digit is too short (the digit is less than a limiting value), or the key is transmitted in clear text or the access permission of the storage location of the key is too low (the permission is lower than a limiting value), etc., when the administrator confirms that update is needed, then the consultation of session key is conducted again, wherein the mechanisms taken for consultation of the session keys of various nodes are identical. As shown in FIG. 5, by taking the consultation flow chart of the session key of the engineer station and the trusted PLC controller as an example, there are mainly 6 steps.

The key consultation process is described in detail, wherein FIG. 5 takes NGU security communication module (defined as a receiver) and the engineer station (defined as an initiator) as examples, but this process is adapted to the key negotiation process among other nodes of the method of the present application:

a) An initiator transmits a digital certificate and signature data, wherein the signature data comprises: signature content (comprising: node name information, IP address, time stamp and random number), and signed information on the engineer station signature certificate (the signature object is the signature content);

b) a receiver verifies the signature data of a); if the signature data passes the authentication, communication is continued; and the receiver transmits the digital certificate and the signature data; refer to the content of a) for the content of the signature data;

c) the initiator verifies the signature data of the receiver in step b); if the signature data passes the authentication, communication is continued; the initiator transmits symmetrical key pair information n encrypted based on the public key of the receiver; and a random number is attached to ensure uniqueness;

d) the receiver transmits symmetrical key pair information m encrypted based on the public key of the initiator; and a random number is attached to ensure uniqueness;

e) the initiator and the receiver process n information and m information (through the methods of summation, exclusive-or, etc.) to generate symmetrical key pairs; and the initiator encrypts "a random number+time label" using the symmetrical key pair to reply; and f) the receiver decrypts the data transmitted by the initiator, and adds 1 to the random number; and the receiver encrypts the information of "the random number added with 1" and the time label using the symmetrical keys.

(7) Abnormal state passive response mechanism: other abnormal behaviors are detected by the system. The abnormal behavior discovered by this manner is, a normal (not abnormal) communication model is established through a self-learning manner. This method is realized through a one-class support vector machine (SVM) method. Specific key attributes are extracted from the support vector machine (extracted through a feature extraction method according to needs, such as IP, port, protocol, protocol feature s of the industrial application layer, etc.) to build a model, so as to give an alarm for all behaviors that violate the normal communication model. The administrator confirms the alarm content, and provides three operations of identity authentication, re-negotiation of the communication key and update of the access control rule.

We claim:

1. A dynamic security method based on multi-fusion linkage response, comprising:
   conducting identity validity authentication on an authentication data flow through own digital certificate B and other communication nodes by the following sub-steps:
   a) initiating, by an initiator, an identity authentication request to establish a TCP handshake link;
   b) transmitting, by the initiator, the identity authentication request;
   c) confirming, by a receiver, the identity request;
   d) transmitting, by the initiator, a signature certificate A;
   e) transmitting, by the initiator, an encryption certificate B;
   f) confirming, by the receiver, the signature certificate A and the encryption certificate B transmitted by the initiator to conduct signature verification;
   g) transmitting, by the receiver, a signature certificate C;
   h) transmitting, by the receiver, an encryption certificate D; and
   i) confirming, by the initiator, the signature certificate and the encryption certificate transmitted by the receiver to conduct signature verification to complete authentication,
allowing data communication when the authentication is confirmed, or blocking data communication when the authentication fails, and issuing an alarm when an unauthorized access is detected on a non-authentication data flow; causing an administrator to confirm whether the abnormal behavior is valid when the access control active response module detects an abnormal behavior;
causing the administrator to confirm whether the certificate needs to be processed when detecting an abnormal pretending behavior on the non-authentication data flow;
causing the administrator to confirm whether the key needs to be processed and, when confirmed, negotiating a session key when detecting a key vulnerability or an overdue event on the non-authentication data flow; and
building a communication model to issue an alarm for all behaviors that violate the communication model when detecting other abnormal behaviors on the non-authentication data flow.

2. The dynamic security method based on multi-fusion linkage response according to claim 1, wherein detecting the non-authentication data flow comprises the following sub-steps:
   a) capturing data flows through a promiscuous mode of a network card;
   b) conducting protocol analysis on the captured data;
   c) parsing an application layer protocol of the protocol; and
   d) matching protocol parsing contents in the data flows with the set matching rule contents for consistence; if consistent, setting a journal or directly releasing the data flows; otherwise, blocking the data flows and warning; and preventing all the data flows from passing by default.

3. The dynamic security method based on multi-fusion linkage response according to claim 1, wherein negotiating the session key comprises the following sub-steps:
   a) transmitting, by an initiator, a digital certificate B and signature data;
   b) verifying, by a receiver, the signature data of the initiator, when the signature data passes the authentication, continuing the communication and transmitting the receiver's own digital certificate B and the signature data;
   c) verifying, by the initiator, the signature data of the receiver, when the signature data passes the authentication, continuing the communication and transmitting, by the initiator, symmetrical key pair information N encrypted based on the public key of the receiver with a first attached random number;
   d) transmitting, by the receiver, the symmetrical key pair information M encrypted based on the public key of the initiator with a second attached random number;
   e) processing, by the initiator and the receiver, information N and information M to generate symmetrical key pairs; and encrypting, by the initiator, a third random number+time label using the symmetrical key pair to reply; and
   f) decrypting, by the receiver, the data transmitted by the initiator, and adding 1 to the third random number; and encrypting, by the receiver, the information of the third random number added with 1 and the time label using the symmetrical keys.

4. A dynamic security system based on multi-fusion linkage response, comprising:
   an access authentication active response module, wherein the site control device conducts identity validity authentication on an authentication data flow through own digital certificate B and other communication nodes through exchanges between an initiator and a receiver; and communication is allowed after passing the authentication; wherein the exchanges between the initiator and the receiver comprise:
   a) the initiator initiates an identity authentication request to establish a TCP handshake link;
   b) the initiator transmits the identity authentication request;
   c) the receiver confirms the identity request;
   d) the initiator transmits a signature certificate A;
   e) the initiator transmits an encryption certificate B;
   f) the receiver confirms the signature certificate A and the encryption certificate B transmitted by the initiator to conduct signature verification;
   g) the receiver transmits a signature certificate C;
   h) the receiver transmits an encryption certificate D; and
   i) the initiator confirms the signature certificate and the encryption certificate transmitted by the receiver to conduct signature verification to complete authentication, an access control active response module, wherein data communication is immediately blocked and an alarm is given when an unauthorized access is detected on a non-authentication data flow;

an access control passive response module which is triggered when the access control active response module detects an abnormal behavior, wherein an administrator confirms whether the abnormal behavior is valid;

an abnormal pretending passive response module, wherein when an abnormal pretending behavior is detected on the non-authentication data flow, the administrator confirms whether the certificate needs to be processed;

a key vulnerability passive response module, wherein when a key vulnerability or an overdue event is detected on the non-authentication data flow, the administrator confirms whether the key needs to be processed; if so, negotiation of a session key is conducted; and an abnormal state passive response mechanism module, wherein when other abnormal behaviors are detected on the non-authentication data flow, a communication model is built to give an alarm for all behaviors that violate the communication model.

5. The dynamic security system of claim 4, wherein the access control active response module is configured to detect the non-authentication data flow by a) capturing data flows through a promiscuous mode of a network card;

b) conducting protocol analysis on the captured data;

c) parsing an application layer protocol of the protocol; and d) matching protocol parsing contents in the data flows with the set matching rule contents for consistence; if consistent, setting a journal or directly releasing the data flows; otherwise, blocking the data flows and warning; and preventing all the data flows from passing by default.

6. The dynamic security system of claim 4, wherein the key vulnerability passive response module is configured to negotiate a session by:

a) transmitting, by an initiator, a digital certificate B and signature data;

b) verifying, by a receiver, the signature data transmitted by the initiator; if the signature data passes the authentication, continuing the communication and transmitting the receiver's own digital certificate B and the signature data;

c) verifying, by the initiator, the signature data of the receiver; if the signature data passes the authentication, continuing the communication; transmitting, by the initiator, symmetrical key pair information N encrypted based on the public key of the receiver; and attaching a random number;

d) transmitting, by the receiver, the symmetrical key pair information M encrypted based on the public key of the initiator; and attaching a random number;

e) processing, by the initiator and the receiver, information N and information M to generate symmetrical key pairs; and encrypting, by the initiator, a random number with a time label using the symmetrical key pair to reply; and f) decrypting, by the receiver, the data transmitted by the initiator, and adding 1 to the random number; and encrypting, by the receiver, the information of the random number added with 1 and the time label using the symmetrical keys.

\* \* \* \* \*